May 26, 1925.
A. R. JAYNE
1,539,572
STEEL AUTOMOBILE WHEEL
Filed Aug. 20, 1924
2 Sheets-Sheet 1
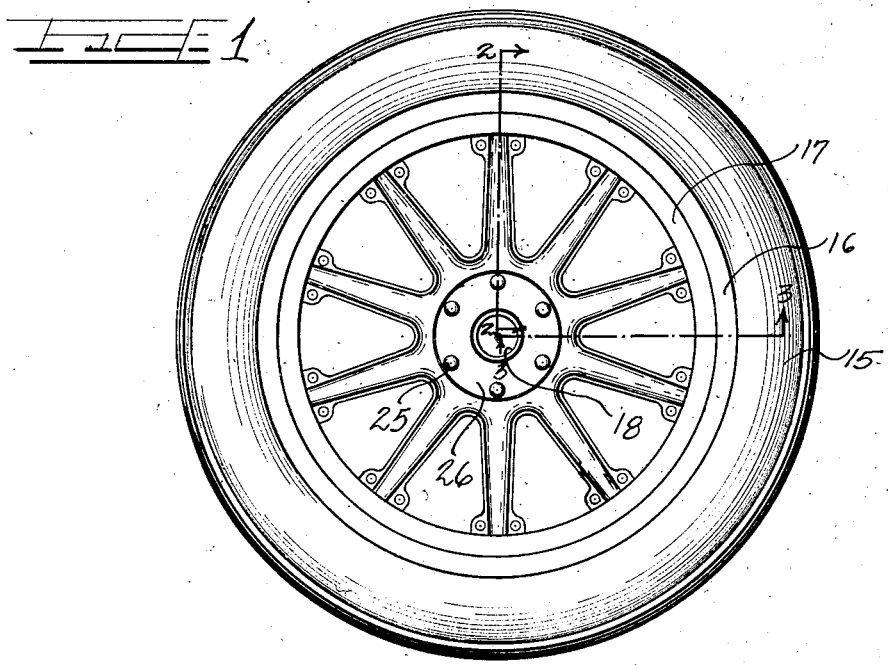
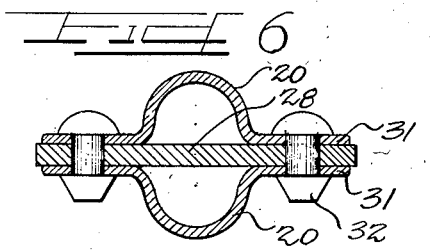
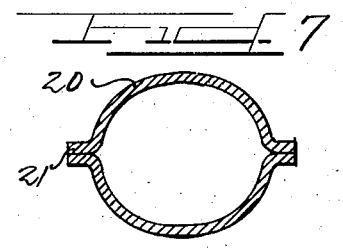
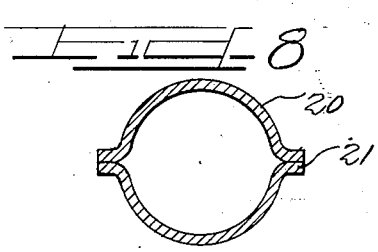
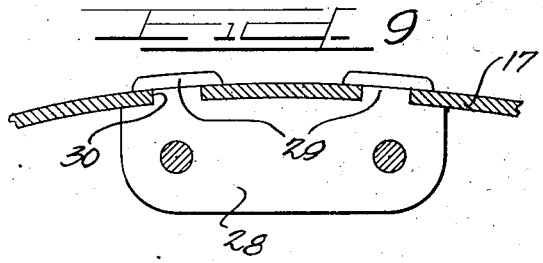
Inventor
Ames Rowles Jayne.
By Attys

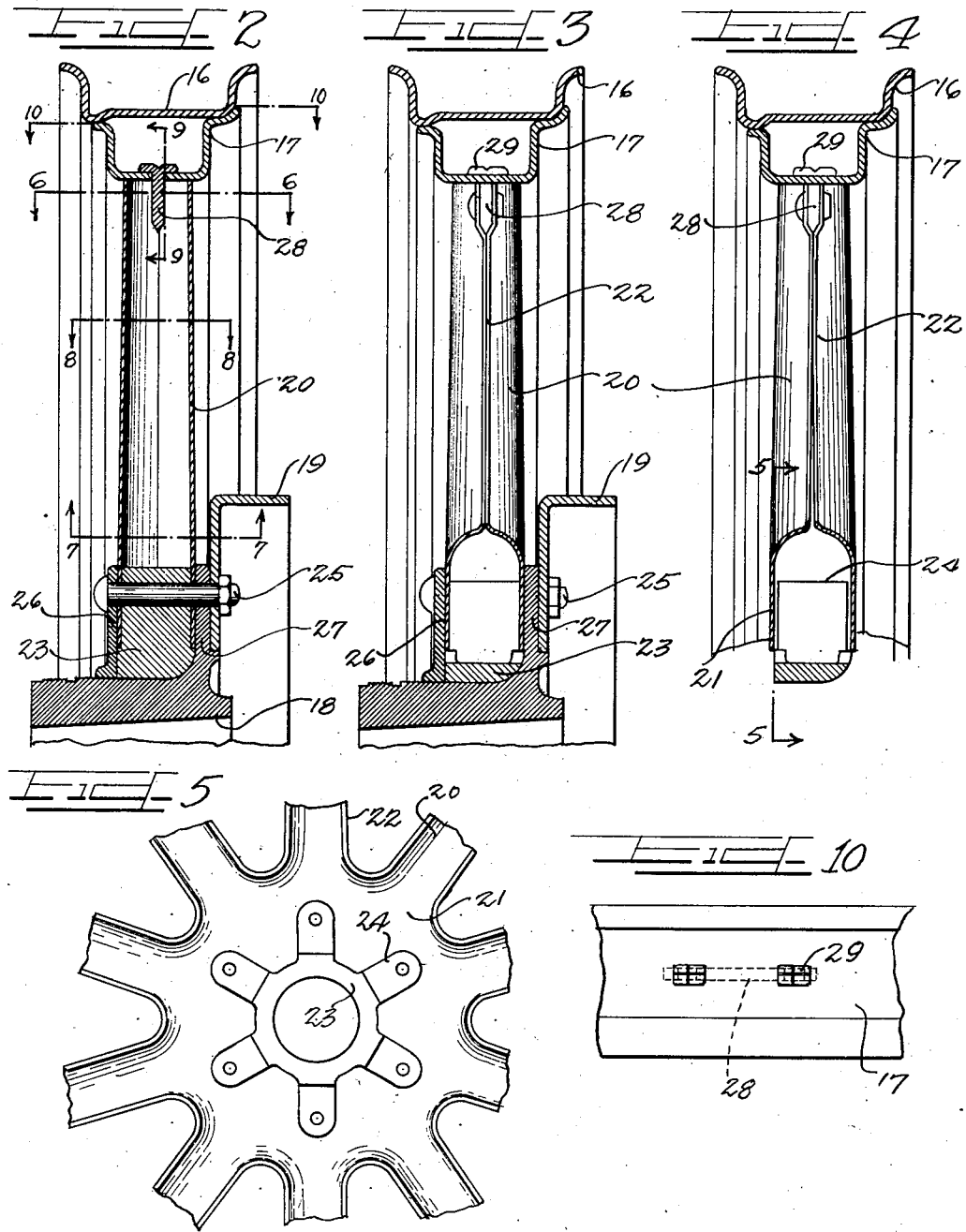

Patented May 26, 1925.

1,539,572

UNITED STATES PATENT OFFICE.

AMES R. JAYNE, OF CHICAGO, ILLINOIS, ASSIGNOR TO AMERICAN STEEL WHEEL CORPORATION, OF CHICAGO, ILLINOIS, A CORPORATION OF ILLINOIS.

STEEL AUTOMOBILE WHEEL.

Application filed August 20, 1924. Serial No. 733,064.

*To all whom it may concern:*

Be it known that I, AMES ROWLES JAYNE, a citizen of the United States, and a resident of the city of Chicago, in the county of Cook and State of Illinois, have invented certain new and useful Improvements in a Steel Automobile Wheel; and I hereby declare that the following is a full, clear, and exact description of the same, reference being had to the accompanying drawings, and to the numerals of reference marked thereon, which form a part of this specification.

This invention relates to metal vehicle wheels and particularly to pressed metal wheels for automotive vehicles.

It is an object of this invention to provide an improved sheet metal wheel incorporating features of ease and simplicity of assembly, reduced cost of manufacture, and increased resiliency of the completed wheel to absorb the road shocks without injury to the wheel.

It is another object of this invention to provide a steel felloe band of standard cross-section, as used with wooden spoked wheels, adapted for use with a metal spoked wheel.

It is a further object of this invention to provide a pressed metal spoked wheel comprising two halves meeting in the median plane of the wheel and having the spoke halves bowed inwardly at the center of their length in the general form of a rudimentary hyperbola wherein the maximum curve is at the center and the curve approaches a straight line at the points of attachment to the rim and hub of the wheel.

It is also an object of this invention to provide a two piece spoked sheet metal wheel wherein the separate halves are secured together at the rim and hub, the intermediate portions of the spokes being pressed together by slightly bowing the same before assembly to obtain resilient spokes capable of slight yielding to absorb dangerous shocks without permanent distortion.

It is another object of this invention to provide an improved attachment between the spokes and the felloe comprising a plate riveted between the spoke halves and having lugs projecting through the felloe and riveted over within the felloe channel.

It is an object of this invention to provide a superior wheel of the class described with the least possible mechanical operation and affording maximum strength and durability with low cost.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of a vehicle wheel embodying the features of this invention including a pneumatic tire mounted thereon.

Figure 2 is an enlarged section on the line 2—2 of Figure 1.

Figure 3 is an enlarged section on the line 3—3 of Figure 1.

Figure 4 is a section similiar to Figure 3 before securing the spokes to the hub, to illustrate the initial distortion of the spoke halves.

Figure 5 is a fragmentary view of the hub and spokes with the outer spoke halves omitted.

Figure 6 is a section on the line 6—6 of Figure 2.

Figure 7 is a section on the line 7—7 of Figure 2.

Figure 8 is a section on the line 8—8 of Figure 2.

Figure 9 is a section on the line 9—9 of Figure 2.

Figure 10 is a section on the line 10—10 of Figure 2.

As shown on the drawings:

A pneumatic tire 15 and demountable rim 16 therefor are indicated in the figures. The rim 16 is mounted in the usual manner on a channel sectioned metal felloe 17 the cross sectional outline of which need not depart in any material way from the steel felloes commonly used with wood spokes for automotive vehicles. A wheel hub 18 and brake drum 19 are shown in the drawings, although it will be evident that the brake drum is not an essential element but is included because a hub for the rear axle was chosen for illustration.

The general circular tapered form of the wheel spokes resembles that of a wooden wheel, the spokes 20 proper being formed in half sections integral with hub discs 21 the two sections being duplicates formed by punching and pressing or stamping from sheet metal. The spoke halves 20 are in the general form of a semi-circle with out-turned flanges 22 forming the mating surfaces between the halves. The spokes and flanges are pressed to form a slight convex curve on the order of a hyperbola, the curve having a variable radius least at the center of the length of the spokes and greatest at the ends of the spokes to concentrate the initial bend or deformation at the center of the spokes.

The central discs 21 from which the spokes radiate are slipped over the hub 18 with a centering spacer block 23 therebetween having bosses 24 apertured for through bolts 25 which extend from an outer flange 26 through the spoke discs and an inner flange 27 integral with the hub. If a brake drum is used these bolts serve to make it a part of the assembly.

Flat plates 28, one for each spoke, are secured to the inner surface of the felloe by two lugs 29 inserted in apertures 30 in the felloe and headed over inside the channel of the felloe. These plates are wider than the tip diameter of the spokes, which are provided with lugs 31 covering the plate, and rivets 32 are used to secure the lugs 31 to the plate 28 to form a secure attachment between the felloe and the spokes.

This invention provides a sheet metal spoke wheel that may be substituted for the usual wooden artillery wheel by simply removing the hub bolts and outer hub plate slipping the wooden wheel from the hub and substituting the wheel of this invention therefor then replacing the hub plate and bolts.

The operation of assembling the wheel involves slipping the inner half of the spoke discs over the usual hub, adding the hub spacer and placing the felloe in position, and adding the outer half of the spoke discs to the hub. The tips of the spokes are next riveted to the felloe plates 28, producing an assembly such as is shown in Figure 4, with the inner ends of the spokes and the spoke discs spread apart due to the initial distortion of the spokes. Upon adding the loose flange to the hub and bolting up the hub assembly the spokes are drawn tightly together along their out-turned flanges 22 with an initial stress sufficient to maintain a tight joint without welding or riveting though welding may be resorted to if desired. The hyperbolic curve given the flanges has been found to give the most uniform distribution of pressure along the entire length of the flange joints. It will be noted that such a joint produces a wheel having lateral resiliency due to the ability of the joint to permit relative movement of the two spoke halves without in any way lessening the strength of the wheel in other particulars.

The initial bowing or curvature given the spoke halves results in slightly shortening the spoke halves in their free condition. The spoke halves are therefore made slightly longer than would be possible without bending and are expanded into position against the felloe when the spoke halves are brought together, tensioning the felloe and compressing the spokes, thus insuring very firm contact between the spokes and the felloe.

I am aware that many changes may be made, and numerous details of construction may be varied through a wide range without departing from the principles of this invention, and I therefore do not purpose limiting the patent granted hereon, otherwise then necessitated by the prior art.

I claim as my invention:

1. A metallic wheel comprising a felloe and sheet metal discs having half spoke sections integral therewith, flanges on the edges of the spoke sections adapted to abut when two discs are assembled to form the wheel, said flanged spoke sections being distorted to present slightly convex mating surfaces prior to assembly.

2. A hollow spoke metallic wheel comprising two similar discs of sheet metal formed with radiating half section spokes, a felloe band, plates riveted between the ends of the spokes, and lugs on said plates riveted through apertures in said felloe band.

3. A metallic wheel comprising two opposed sheet metal sections forming hub and spoke sections, the spoke portion of each section being approximately semicircular in form, a felloe band, plates secured between the ends of each spoke and lugs on said plates adapted to be riveted through apertures in said felloe band.

4. A two piece spoked sheet metal wheel comprising half section spokes, central discs integral with each half section, and lengthwise curved bearing flanges on the half section spokes.

5. A two piece spoked sheet metal wheel comprising half section spokes, central discs integral with each half section, lengthwise curved bearing flanges on the half section spokes, a felloe band, and plates secured between the ends of the spokes and said felloe band.

6. A metal wheel comprising a felloe band, mating spoke sections formed in halves integral with central discs, a hub, flanges co-operating with said hub to secure the central discs thereto, a spacer between the central discs, and means for securing the ends of the spoke halves together and to the felloe band.

7. A metal wheel comprising a felloe band, mating spoke sections formed in halves integral with central discs, a hub, flanges co-operating with said hub to secure the central discs thereto, a spacer between the central discs, plates secured between the ends of the spoke halves, and lugs on said plates adapted to pass through apertures in said felloe band and be riveted over the band.

8. A sheet metal wheel comprising half spoke sections, hub discs integral with said spoke sections, and curved bearing flanges integral with said spoke sections.

9. A wheel comprising a felloe band, hub discs, flanged half section spokes integral with said hub discs, and means disposed between abutting half section spokes for connecting said half section spokes to said rim.

10. A wheel comprising a felloe portion, and a pair of integral combination hub and spoke wheel halves adapted to abut one another, and plates inserted between the wheel halves adapted to be connected to said rim.

In testimony whereof I have hereunto subscribed my name in the presence of two subscribing witnesses.

AMES R. JAYNE.

Witnesses:
CARLTON HILL,
OSCAR HARTMANN.